United States Patent [19]

Patel et al.

[11] Patent Number: 4,637,883
[45] Date of Patent: Jan. 20, 1987

[54] FLUID LOSS ADDITIVES FOR OIL BASE MUDS AND LOW FLUID LOSS COMPOSITIONS THEREOF

[75] Inventors: Arvind D. Patel, Houston; Carmelita S. Salandanan, Sugarland, both of Tex.

[73] Assignee: Dresser Industries, Inc., Dallas, Tex.

[21] Appl. No.: 848,559

[22] Filed: Apr. 7, 1986

Related U.S. Application Data

[62] Division of Ser. No. 661,639, Oct. 17, 1984.

[51] Int. Cl.$^4$ ................................................ C09K 7/06
[52] U.S. Cl. .............................. 252/8.515; 252/8.511
[58] Field of Search ......................... 252/8.5 M, 8.5 P

[56] References Cited

U.S. PATENT DOCUMENTS

| | | | |
|---|---|---|---|
| 2,675,353 | 4/1954 | Dawson | 252/8.5 |
| 2,816,073 | 12/1957 | Stratton | 252/8.5 |
| 2,861,042 | 11/1958 | Watkins | 252/8.5 |
| 2,871,188 | 1/1959 | Watkins | 252/8.5 |
| 3,168,475 | 2/1965 | Jordan et al. | 252/8.5 |
| 3,232,870 | 2/1966 | Cowan et al. | 252/8.5 |
| 4,421,655 | 12/1983 | Cowan | 252/8.5 |
| 4,508,628 | 4/1985 | Walker et al. | 252/8.5 |

*Primary Examiner*—Herbert B. Guynn

[57] ABSTRACT

A novel ammonium salt of quebracho prepared by reacting quebracho with alkyl quaternary ammonium salts is an effective fluid loss control agent when used in oil base drilling fluids for use in drilling oil and gas wells, especially in water in oil emulsion drilling mud formulations, controlling filtrate loss of the oil-base mud under high temperature and high pressure conditions.

10 Claims, No Drawings

FLUID LOSS ADDITIVES FOR OIL BASE MUDS AND LOW FLUID LOSS COMPOSITIONS THEREOF

This is a division of application Ser No. 661,639 filed Oct. 17, 1984.

BACKGROUND OF THE INVENTION

The rotary drilling of oil and gas wells requires use of circulating fluids, usually identified as drilling muds. These muds are normally circulated in the wells by means of reciprocating pumps. The mud is pumped down the drill pipe and out into the well bore through small holes in the drill bit against the bottom and sides of the hole, and back up the well in the annular space between the drill pipe and walls of the wellbore, carrying with it drill cuttings and the like that are then removed before recirculation. While this mud performs a number of functions, including removing drill cuttings, keeping the bit cool, providing flotation to help support the weight of the drill pipe and casing and the like, one of the most important functions is to coat the wellbore surface to prevent caving in and prevent undesirable flow of fluids in or out of the wellbore, including drilling fluids, brine and the like. The properties of this coating are critical to future production and recovery.

Obviously, the properties of and the composition of these drilling mud formulations are complex and variable, depending on the conditions involved and the results desired or required. One of the most important properties of these drilling muds and other drilling fluids in their ability to resist filtraton. To prevent formation fluids and the like from entering the wellbore hole, the hydrostatic pressure of the mud column must be greater than the pressure of the fluids in the pores of the formation. As a result, there is a tendency for the drilling fluids or muds to invade the permeable wellbore formations, that is, the liquid portions of the mud. This is referred to in the art as the filtrate. As a result, the mud solids are filtered out onto the walls of the wellbore hole and this often results in a coating or cake. The muds must be formulated so as to keep the deposited cake permeability as low as possible in order to maintain a stable borehole and minimize filtrate invasion of, and damage to, potentially productive strata and horizons in the production formation. Thus, formulation is critical and one major problem with drilling mud is this loss of filtrate, referred to as fluid loss.

Lignite, and its derivative, humic acid, have been widely used in drilling mud applications, often in association with amines. However, because of the poor dispersability of these materials in the oil phase in oil base muds, more effective fluid loss control agents are desired.

The fluid loss problem and its control differs with different drill fluids, particularly drilling muds for rotary drilling. Two major types of drilling mud systems employed are often referred to as oil-in-water emulsions and water-in-oil emulsions, each type having its own particular advantages, problems, requirements and the like. In general, water-in-oil emulsions are preferred in many applications.

This invention is directed to oil based fluids or drilling muds, especially water in oil emulsions, that provide improved fluid loss as compared to known water in oil base drill muds, particularly under conditions of high temperatures and pressures.

SUMMARY OF THE INVENTION

A novel ammonium salt of quebracho prepared by reacting quebracho with alkyl quaternary ammonium salts is an effective fluid loss control agent when use in oil base drilling fluids for use in rotary drilling of oil and gas wells, especially in water in oil emulsion drilling mud formulations, controlling filtrate loss of the oil-base mud under high temperature and high pressure conditions.

PRIOR ART STATEMENT

This invention involves preparation of ammonium salts of quebracho, by reaction of an alkly quaternary ammonium salt with quebracho, and use of the ammonium salts of quebracho as effective fluid loss agents in oil base drilling mud formulations.

Both quebracho and alkyl quaternary ammonium salts have been used separately in fluids for oil field applications, but not in the form of the quebracho ammonium salt, which novel salt is particularly useful in oil base mud drilling fluids for controlling fluid or filtrate loss.

Use of quebracho in a variety of oil field applications in fluid is described in many patents, usually as dispersion or emulsifier constituents in drilling fluid compositions. Typical patents include the following.

Watkins, in U.S. Pat. No. 2,691,630 discloses a drilling fluid comprising water, oil emulsified therewith as a discontinuous phase, a weighting agent, caustic, lime, and perferably, clay. Quebracho and lignin are disclosed as dispersing and emulsifying agents.

Wilson, in U.S. Pat. No. 2,698,833 discloses non-fluorescing emulsion type drilling fluids using a particular refined oil. As an emulsifier for his fluids Wilson teaches use of a powdered mixture of lignite, sodium humate and quebracho.

In a related patent, U.S. Pat. No. 2,782,163, Wilson teaches the use, in emulsion drilling fluid compositions, of an emulsifier composition of sodium humate, lignite, quebracho, tetrasodium pyrophosphate and calcium carbonate.

Watkins, in U.S. Pat. No. 2,871,188 discloses a drilling fluid for use under high temperature drilling conditions; comprising water, bentonite, quebracho, a lignitic emulsion stabilizer, caustic, heat stable waterloss reducing agents, a weighting agent, oil emulsified as a discontinuous phase and lime. The quebracho is stated to be essential in order to assist satisfactory dispersion of the solid materials in the drilling fluid. The water loss reducing agents disclosed were sodium carboxymethycellulose, sodium carboxymethylhydroxyethylcellulose and polyacrylonitrile.

Wilson et al, in U.S. Pat. No. 3,956,142 disclose non-corroding drilling fluids comprising an additive system of an alkali metal lignin, lignite, quebracho and a water soluble chromium (VI) salt, admixed with a claywater mixture to formulate the drilling fluid.

The alkyl quaternary ammonium salts also are proposed for a variety of reasons and uses in drilling fluids in patents. Typical are the following.

Dawson, in U.S. Pat. No. 2,675,353, discloses oil-contraining drilling fluids containing inorganic silicates bearing organo-substituted ammonium radicals. These materials are obtained by treating clays such as bentonite with surface active agents comprising quaternary ammonium bases and salts, preferably tetra-alkyl ammonium hydroxides and halides. Optionally, the drilling emulsions may contain suitable emulsifying agents, e.g, soaps of fatty acids, resin acids, tall oil and the like.

Stratton, in U.S. Pat. No. 2,816,073, discloses stabilizing emulsion drilling fluids with certain compounds resulting from the interaction of organic quaternary ammonium compounds with certain cellulosic acids and salts, such as carboxyalkyl cellulose ethers and alkali, alkaline or ammonium salts thereof, as acid carboxyethyl cellulose ethers and sodium carboxymethyl cellulose.

Watkins, in U.S. Pat. No. 2,861,042, discloses a water in oil emulsion drilling fluid containing, as the emulsifying agent, tall oil which has been treated with oxygen, and as an additive, a quaternary amine such as dimethyl didodecyl ammonium chloride.

Jordan et al, in U.S. Pat. No. 3,168,475, disclose oil base well working fluids having improved fluid loss characteristics prepared by first treating an oily liquid as diesel oil with a salt of humic acid having the formula $R_1R_2R_3R_4N^+HU^-$ wherein at least once of the R's is an alkyl radical having from 12 to 22 carbon atoms in a straight chain, and $Hu^-$ is the anion of humic acid. In an example, lignite and dimethyldioctadecyl ammonium chloride were ground together, air dried and added to diesel oil in a mixer.

Cowan, in U.S. Pat. No. 4,421,655, discloses preparation of oil base well-working compositions having a low filter loss. The fluid loss additives are obtained by reacting together one or more polyphenolic acid compounds with one or more polyamino compounds and a polyvalent metallic cation compound to provide organophilic ammonium salts of polyphenolic compounds. While Cowan discloses a great variety of polyphenolic compounds, quebracho is conspicuous by its absence, he prefers humic acid; and the amino compounds to be used are polyamines or polyamidoamine, not alkyl quaternary ammonium salts, and preferably are amidoamines.

DETAILED DESCRIPTION

The alkyl quaternary ammonium compounds used in the practice of this invention to prepare the ammonium salt of quebracho have the general formula

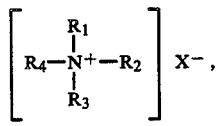

wherein $R_1$, $R_2$, $R_3$ and $R_4$ are alkyl grups, at least one of which is an alkyl group containing from 1 to 6 carbon atoms, preferably 1 to 4 carbon atoms, and at least one of which, preferably two, is a saturated or unsaturated alkyl group containing 10 to 22 carbon atoms, preferably saturated alkyl radicals containing 14 to 20 carbon atoms, and more preferably $C_{16}$ to $C_{18}$; and aralkyl groups; and X is an anion, a halogen, $SO_4^-$ or $OH^-$, and more preferably is a chloride ion. Typical useful alkyl quaternary ammonium compounds include dimethyl ditetradecyl ammonium chloride, dimethyl dipentadecyl ammonium chloride, dimethyl dihexadecyl ammonium chloride, dimethyl diheptadecyl ammonium chloride, dimethyl dioctadecyl ammonium chloride, dimethyl dinonadecyl ammonium chloride, dimethyl dilicosane ammonium chloride, dimethyl didodecasane ammonium chloride, diethyl ditetradecyl ammonium chloride, diethyl dipentadecyl ammonium chloride, diethyl dihexadecyl ammonium chloride, diethyl diheptadecyl ammonium choride, diethyl dioctadecyl ammonium chloride, diethyl dinonadecyl ammonium chloride, diethyl dilicosane ammonium chloride, diethyl didodecasane ammonium chloride, trimethyl hexadecyl ammonium chloride, trimethyl octadecyl ammonium chloride, methyl trihexadecyl ammonium chloride, methyl trioctadecyl ammonium chloride, dimethyl hexadecyloctadecyl ammonium chloride, dimethyl dioctadecyl sulfate, dimethyl dioctadecyl hydroxide, dipropyl dioctadecyl chloride, dimethyl dioctadecyl bromide, dimethyl benzyl dodecyl ammonium chloride, dimethyl benzyl octadecyl ammonium chloride, and the like. Many of these materials are commercially available. A preferred amine is dimethyl dioctadecyl ammonium chloride derived from tallow oils or a mixture of $C_{16}$ and $C_{18}$ alkyl chains.

The ammonium salt of quebracho is obtained by adding the alkyl quaternary ammonium salt to powdered quebracho and grinding together for several minutes to provide finely ground quebracho ammonium salt. The quebracho preferably has a particle size in the range of 40 mesh to 400 mesh U.S. Standard, such that at least 50 weight percent passes a 200 mesh screen. The amount of alkyl quaternary ammonium salt added is from about 5 to 50 weight parts per 100 weight parts of quebracho, more preferably about 15 to 30 weight parts per 100 weight parts of quebracho. While more salt may be added, up to 100 parts, no advantage is gained thereby. The quaternary ammonium salt is normally added in a solution, suitable solvents being alcohols, ketones, water, and mixtures thereof, and the like. The concentration is preferably as high as possible so as to have a minimum of the solvent present.

To make test quantities of the ammonium salt of quebracho in the laboratory, the alkyl quaternary ammonium chloride was slowly mixed with the desired amount of finely divided quebracho, and mixed for about 15 minutes in a Waring blender or ground in a mortar and pestle. The resulting reaction products were dried and ground again to a fine powder, at least 50 weight percent of the ammonium salt of quebracho passing a 200 mesh sieve. On a commercial scale, any conventional high intensity mixer may be used, such as a pug mill, Littleford mixer, and the like. After drying and grinding the ammonium salt of quebracho is readily dispersed in the oil base drilling mud formulation by mixing, as by stirring; or the ammonium salt of quebracho may be added at any stage of the formulations of the oil base mud compositions. An advantage of these novel fluid loss agents is their ease of dispersion into the oil base fluids as compared to the more difficultly dispersible lignite-amine reaction products. These ammonium salts, to be effective fluid loss control agents as described, do not require the presence of polyvalent cations and are substantially free of polyvalent metallic cations.

The amounts of the ammonium salt of quebracho used in the oil based formulations will vary from about 1 pound per barrel of oil base drilling muds to about 16 pounds per barrel, more preferably from 3 to 12 pounds per barrel. More than about 16 pounds per barrel normally is not necessary and is expensive, although more can be used as needed.

Oil base drilling muds may be prepared by a great variety of formulations and with a large number of ingredients, as is well known to those skilled in the art.

Specific formulations depend on the state of drilling a well at any particular time, for instance, depending on the depth, the nature of the strata encountered and the like. The compositions of this invention are directed to and particularly adapted to provide improved oil base drilling muds useful under conditions of high temperature and pressure, such as those encountered in deep wells, where many previously proposed and used formulations do not heat age well, and there is an unacceptable fluid loss noted after operations under such high temperature and high pressure conditions.

Oil base mud formulations intended for use under high temperature (up to about 250° C.) and high pressure (up to about 25,000 psi) conditions normally will contain an oil, a weighting agent, an emulsifier, a gelling agent, salts and a fluid loss control agent, as essential ingredients. Water is often added but it may be introduced from the formations themselves during drilling.

The oil used is a petroleum oil, generally diesel oil or mineral oil, although lighter oils such as kerosene, or heavier oils such as fuel oil, white oil, crude oil and the like may also be used.

If water is used, the amount normally is small, and while usually is less than about 10 weight percent, amounts as high as about 40 weight percent may be present under some conditions.

Emulsifiers include those normally used, including alkali and alkaline earth metal salts of fatty acids, rosin acids, tall oil acids, the synthetic emulsifiers such as alkyl aromatic sulfonates, aromatic alkyl sulfonates, long chain sulfates, oxidized tall oils, carboxylated 2-alkyl imidazolines, imidazole salts and the like.

Water soluble salts are added to the formulations, normally the brine salts such as sodium chloride, potassium chloride, sodium bromide, calcium chloride more preferably, and the like, usually in a small amount of water. These salts are added to control the osmotic pressure of the formulations as needed, according to drilling conditions.

Gelling agents include the activated clays, organophilic clays such as bentonite which may have had the surface treated as with quaternary ammonium salts, fatty amines and the like and other gelling or thickening agents such as alkali metal soaps, asphaltic materials, mineral fibers and the like.

Weighting materials include such materials as calcium carbonate, silicates, clays, and the like, but more preferably are the heavier minerals such as the barites, specular hematite, iron ores, siderite, ilmenite, galena, and the like.

These muds normally will be formulated to weigh from greater than 8.75 (no weighting agent) to about 22 pounds per barrel of mud. Usually the range is from about 10 to 18 pounds per barrel.

The practice of the Invention and advantages thereof are described in the following Examples.

EXAMPLES

Two different samples of ammonium salts of quebracho were prepared as follows.

QB-1. 20 grams of dimethyl ditallow ($C_{18}H_{37}$) ammonium chloride, in a 75 weight percent solution of isopropanol, was slowly added to 80 grams of finely divided quebracho (more than 50 weight percent passing through a 200 mesh sieve), and mixed in a mortar and pestle for 15 to 20 minutes. The resulting ammonium salt of quebracho was dried and ground again to a powder, so that at least 50 weight percent passed through a 200 mesh sieve.

QB-2. 30 grams of dimethyl ditallow ammonium chloride was reacted with 70 grams of quebarcho as described above, dried and ground to the desired powder state.

QB-3. For comparison purposes, an amido-amine reaction product with quebracho was prepared. The amido-amine was prepared by adding one mole of diethylenetramine to a reactor equipped with stirring and distilling means. Two moles of distilled tall oil (43% linoleic acid, 44% oleic acid, 13% $C_{12}$–$C_{22}$ fatty acid) was slowly added to the stirred diethylenetriamine at a rate to control the reaction temperature between about 80° to 100° C. After addition to the tall oil fatty acid, the temperature of the reaction mixture was raised to 200° C. and maintained at this temperature for two hours. The water generated during amide formation was distilled off. The resulting amido-amine was then reacted with finely divided quebracho by slowly adding 20 grams of amido-amine to 80 grams of quebracho, and then mixing the reactants in a mortar and pestle for 15–20 minutes to form the quebracho salt. The resulting product was dried and ground so that at least 50 weight percent passed a 200 mesh sieve.

To demonstrate the advantages of the invention, the ammonium salts of quebracho, and the amido-amine were added to portions of a standard oil base drilling mud having an 80:20 oil/water ratio. The formula for this mud formulation was: 192.2 weight parts (0.646 barrel) of a low aromatic content mineral oil (Mentor-28), 3 pounds of a carboxylated 2-alkyl-imidazoline[1], 2 weight parts (2 pounds per barrel) of lime, 2 weight parts (2 pounds per barrel) of oxidized tall oil, a solution of 55.65 weight parts of water (0.159 barrel) and 19.6 weight parts (19.6 pounds per barrel) of $CaCl_2$, 8 weight parts (8 pounds per barrel) of commercial amine treated bentonite clay and 220.5 weight parts (220.5 pounds per barrel) of Battle Mountain barrite. The first four ingredients were mixed together for 20 minutes in a high speed stirrer. The calcium chloride solution was then added and mixed for 20 minutes. The bentonite clay was added and mixed for another 20 minutes. The barite was then added and mixed for 30 minutes. A commercial fluid loss agent, a calcium salt of an amido-amine of lignite was tested as described. The values obtained (Commercial) are set forth in the table for comparison purposes.

[1]Tall oil imidazoline reacted with maleic acid 495 grams of the oil base mud as transferred to 16 ounce containers and 8 grams of the quebracho ammonium salt was slowly added with stirring over a period of 30 to 45 minutes.

The initial observations and fluid loss values were determined on portions of these mixtures. Other portions of the samples were then transferred into a high pressure steel bomb and heated at 300° C. for 16 hours to determine the effect of heat aging on the fluid loss characteristics of the composition. The fluid loss values were determined in accordance with the procedure set forth in API Recommended Practice, API PP 13B, Eigth Edition, April 1980, "STANDARD PROCEDURE FOR TESTING DRILLING FLUIDS" Section 3, conducted under High Temperature and High Pressure conditions of 500 psi and 300° F. to demonstrate the advantages of the invention under these conditions.

The initial and heat aged fluid loss values, both total and as oil/brine ratios are reported.

| SAMPLE | INITIAL F.L. | | HEAT AGED F.L. | |
|---|---|---|---|---|
| | TOTAL | O/B | TOTAL | O/B |
| Base Mud | 9.0 | 7.0/2.0 | 15.0 | 11.0/4.0 |
| Commercial | 6.6 | 6.3/0.3 | 11.0 | 8.0/3.0 |
| QB-1 | 4.0 | 3.6/0.4 | 8.2 | 7.2/1.0 |
| QB-2 | 3.8 | 3.8/0.0 | 7.0 | 7.0/0.0 |
| QB-3 | 6.4 | 6.4/0.0 | 9.2 | 9.2/0.0 |

The decreased fluid loss obtained, compared to that of the base mud not containing the ammonium salt of quebracho, are significant, and the values obtained after heat aging also are excellent. The advantage of the ammonium salt of quebracho over the amido-amine and Commercial lignite product are evident and substantial, representing, on a commercial scale where large volumes of fluid are used, a tremendous decrease in overall total fluid loss, one point being substantial, and even fractions of a point decrease in fluid loss representing a commercial advantage.

When these tests were repeated with an oil base mud formulation using #2 diesel oil instead of mineral oil, the test results were obtained:

| SAMPLE | INITIAL F.L. | | HEAT AGED F.L. | |
|---|---|---|---|---|
| | TOTAL | O/B | TOTAL | O/B |
| Base Mud | 13.0 | 9.2/4.0 | 18.0 | 13.0/5.0 |
| QB-1 | 4.4 | 4.4/0.0 | 9.0 | 9.0/0.0 |
| QB-2 | 3.6 | 3.6/0.0 | 8.0 | 8.0/0.0 |

To demonstrate the advantages of the ammonium salts of quebracho as fluid loss agents compared to reaction products of lignite with an alkyl quaternary ammonium salt and amido-amines, reaction products of lignite were prepared and tested as follows.

LG-1. 80 grams of finely divided North Dakota lignite was mixed with 20 grams of dimethyl ditallow ammonium chloride in a mortar and pestle and ground together for about 20 minutes. The reaction product was then dried and finely ground again.

LG-2. 65 grams of North Dakota lignite was ground with 35 grams of dimethyl ditallow ammonium chloride as described above.

These two materials were then tested in the base mud using mineral oil as described above and the resulting formulation tested for fluid loss, initially and after heat aging as described. The fluid loss results obtained were:

| SAMPLE | INITIAL F.L. | | HEAT AGED F.L. | |
|---|---|---|---|---|
| | TOTAL | O/B | TOTAL | O/B |
| LG-1 | 4.0 | 4.0/0.0 | 11.0 | 9.6/1.4 |
| LG-2 | 7.2 | 7.0/0.2 | 9.8 | 8.6/1.2 |

In addition to the more difficult dispersability of the lignite reaction products, the fluid loss in the lignite reaction products' compositions was substantially higher than that obtained with the ammonium salt of quebracho compositions.

We claim:

1. An oil base drilling mud formulation comprising a petroleum oil, an emulsifier, a water soluble salt, a gelling agent, a weighting agent and a quebracho ammonium salt reaction product of quebracho with an alkyl quaternary ammonium salt having the formula

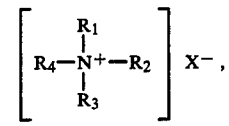

wherein $R_1$, $R_2$, $R_3$ and $R_4$ are alkyl groups, at least one of which contains from 1 to 6 carbon atoms and at least one of which contains 10 to 22 carbon atoms, or aralkyl groups wherein the alkyl contains 1 to 3 carbon atoms; X is a halogen, sulfate or hydroxyl anion, said quebracho ammonium salt reaction product being present in an amount sufficient to reduce the fluid loss of said oil base drilling mud by filtration.

2. A formulation of claim 1 wherein the petroleum oil is diesel oil, the emulsifier is a fatty acid emulsifier, the water soluble salt is sodium or calcium chloride, dissolved in water, the gelling agent is an organophilic clay, the weighting materials are barite or an iron ore, and quebracho ammonium salt wherein two of the alkyl groups contain 1 to 4 carbon atoms, two of the alkyl groups contain 14 to 20 carbon atoms, and X is chloride.

3. A formulation of claim 2 wherein the emulsifier is a tall oil emulsifier, the salt is calcium chloride, the gelling agent is organophilic bentonite clay, the weighting agent is barite, and in the quebracho ammonium salt about 5 to 50 weight parts of said alkyl quaternary ammonium salt is reacted with 100 weight parts of quebracho.

4. A formulation of claim 3 wherein in the quebracho ammonium salt $R_1$ and $R_4$ are methyl groups, $R_1$ and $R_2$ are alkyl groups containing from 16 to 18 carbon atoms and about 20 to about 40 weight parts of said alkyl quaternary ammonium salt is reacted with 100 weight parts of quebracho.

5. A formulation of claim 3 wherein in the quebracho ammonium salt $R_1$ and $R_2$ are $—C_{18}H_{37}$ radicals.

6. In a process wherein a petroleum oil base drilling mud is introduced into a well wherein said mud is subject to fluid loss by filtration, the step comprising adding to the oil base drilling mud quebracho ammonium salt reaction product of quebracho with an alkyl quaternary ammonium salt having the formula

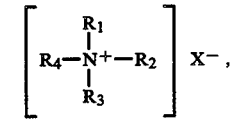

wherein $R_1$, $R_2$, $R_3$ and $R_4$ are alkyl groups, at least one of which contains from 1 to 6 carbon atoms and at least one of which contains 10 to 22 carbon atoms, or an aralkyl group wherein the alkyl contains 1 to 3 carbon atoms; X is a halogen, sulfate or hydroxyl anion, in an amount to reduce the fluid loss of said oil base drilling mud by filtration.

7. A process of claim 6 wherein in said quebracho ammonium salt two of the alkyl groups contain 1 to 4 carbon atoms, two of the alkyl groups contain 14 to 20 carbon atoms, and X is chloride.

8. A process of claim 7 wherein about 5 to 50 weight parts of said alkyl quaternary ammonium salt is reacted with 100 weight parts of quebracho.

9. A process of claim 8 wherein $R_1$ and $R_4$ are methyl groups, $R_1$ and $R_2$ are alkyl groups containing from 16 to 18 carbon atoms and about 20 to about 40 weight parts of said alkyl quaternary ammonium salt is reacted with 100 weight parts of quebracho.

10. A process of claim 9 wherein $R_1$ and $R_2$ are $—C_{18}H_{37}$ radicals.

* * * * *